(12) United States Patent
Hirano et al.

(10) Patent No.: US 11,065,597 B2
(45) Date of Patent: Jul. 20, 2021

(54) XENON ADSORBENT

(71) Applicant: TOSOH CORPORATION, Yamaguchi (JP)

(72) Inventors: Shigeru Hirano, Yamaguchi (JP); Keisuke Tokunaga, Yamaguchi (JP); Hiroshi Okaniwa, Yamaguchi (JP); Megu Fukui, Yamaguchi (JP)

(73) Assignee: TOSOH CORPORATION, Yamaguchi (JP)

( * ) Notice: Subject to any disclaimer, the term of this patent is extended or adjusted under 35 U.S.C. 154(b) by 48 days.

(21) Appl. No.: 16/475,226

(22) PCT Filed: Dec. 26, 2017

(86) PCT No.: PCT/JP2017/046790
§ 371 (c)(1),
(2) Date: Jul. 1, 2019

(87) PCT Pub. No.: WO2018/128136
PCT Pub. Date: Jul. 12, 2018

(65) Prior Publication Data
US 2019/0336938 A1    Nov. 7, 2019

(30) Foreign Application Priority Data

Jan. 6, 2017    (JP) .............................. JP2017-001299
Jun. 28, 2017   (JP) .............................. JP2017-125856
Nov. 14, 2017   (JP) .............................. JP2017-218780

(51) Int. Cl.
| | | |
|---|---|---|
| *B01J 20/18* | (2006.01) |
| *B01J 20/02* | (2006.01) |
| *B01J 20/28* | (2006.01) |
| *C01B 39/46* | (2006.01) |
| *B01J 29/74* | (2006.01) |
| *B01J 29/06* | (2006.01) |
| *B01J 29/67* | (2006.01) |
| *B01J 29/65* | (2006.01) |
| *B01J 29/072* | (2006.01) |
| *B01J 29/68* | (2006.01) |
| *B01J 29/064* | (2006.01) |
| *B01J 29/76* | (2006.01) |
| *B01J 37/00* | (2006.01) |
| *B01J 35/00* | (2006.01) |
| *B01J 20/04* | (2006.01) |
| *B01J 37/02* | (2006.01) |

(Continued)

(52) U.S. Cl.
CPC ........... *B01J 20/18* (2013.01); *B01J 20/0203* (2013.01); *B01J 20/0229* (2013.01); *B01J 20/0233* (2013.01); *B01J 20/0237* (2013.01); *B01J 20/04* (2013.01); *B01J 20/28* (2013.01); *B01J 20/2803* (2013.01); *B01J 20/28071* (2013.01); *B01J 29/061* (2013.01); *B01J 29/064* (2013.01); *B01J 29/072* (2013.01); *B01J 29/65* (2013.01); *B01J 29/67* (2013.01); *B01J 29/68* (2013.01); *B01J 29/743* (2013.01); *B01J 29/7476* (2013.01); *B01J 29/763* (2013.01); *B01J 35/0006* (2013.01); *B01J 37/0009* (2013.01); *B01J 37/0201* (2013.01); *B01J 37/30* (2013.01); *C01B 39/44* (2013.01); *C01B 39/46* (2013.01); *B01J 2229/18* (2013.01); *B01J 2229/186* (2013.01); *B01J 2229/20* (2013.01); *C01P 2002/30* (2013.01); *C01P 2002/84* (2013.01)

(58) Field of Classification Search
CPC ...... B01J 29/061; B01J 29/064; B01J 29/072; B01J 29/65; B01J 29/67; B01J 29/68; B01J 29/7476; B01J 29/7676; B01J 29/743; B01J 29/763; B01J 2229/18; B01J 2229/186; B01J 2229/20; B01J 35/0006; B01J 37/0009; B01J 37/0201; B01J 37/30; B01J 20/18; B01J 20/2803; B01J 20/28071; B01J 20/28; B01J 20/04; B01J 20/0233; B01J 20/0203; B01J 20/0237; B01J 20/0229; C01B 39/44; C01B 39/46; C01P 2002/30; C01P 2002/84
USPC .... 502/60, 63, 64, 66, 68, 69, 74, 400, 406, 502/407, 411, 414
See application file for complete search history.

(56) References Cited

U.S. PATENT DOCUMENTS

| | | | | |
|---|---|---|---|---|
| 4,414,005 A | * | 11/1983 | De Bievre | ............. B01D 53/02 95/127 |
| 4,849,575 A | * | 7/1989 | Lewis | ....................... C07C 1/20 585/640 |
| 5,032,152 A | | 7/1991 | Vansant et al. | |

(Continued)

FOREIGN PATENT DOCUMENTS

| | | |
|---|---|---|
| JP | 2-6814 | 1/1990 |
| JP | 2003-221212 | 8/2003 |

(Continued)

OTHER PUBLICATIONS

Deliere et al., "Role of Silver Nanoparticles in Enhanced Xenon Adsorption Using Silver-Loaded Zeolites", J. Phys. Chem., C 2014, 118, p. 25032-25040.*

(Continued)

*Primary Examiner* — Elizabeth D Wood
(74) *Attorney, Agent, or Firm* — Greenblum & Bernstein, P.L.C.

(57) ABSTRACT

A xenon adsorbent capable of efficiently adsorbing xenon, even at a low concentration, from a mixture gas is Provided. A xenon adsorbent comprising a zeolite having a pore size in the range of 3.5 to 5 Å and a silica alumina molar ratio in the range of 10 to 30.

6 Claims, 2 Drawing Sheets

(51) Int. Cl.
*B01J 37/30* (2006.01)
*C01B 39/44* (2006.01)

(56) References Cited

U.S. PATENT DOCUMENTS

| | | |
|---|---|---|
| 7,824,472 B2 | 11/2010 | Urakami |
| 8,153,091 B2 | 4/2012 | Kimoto et al. |
| 8,232,221 B2 * | 7/2012 | Kuznicki ............... B01J 20/186 502/60 |
| 8,535,414 B2 | 9/2013 | Johnson et al. |
| 8,795,626 B2 * | 8/2014 | Tokunaga ............... C01B 39/48 423/700 |
| 2003/0106335 A1 | 6/2003 | Golden et al. |
| 2005/0000355 A1 | 1/2005 | Urakami et al. |
| 2009/0107331 A1 | 4/2009 | Urakami |
| 2010/0074820 A1 | 3/2010 | Kimoto et al. |
| 2012/0079939 A1 | 4/2012 | Johnson et al. |
| 2019/0336938 A1 * | 11/2019 | Hirano ............... B01J 20/28071 |

FOREIGN PATENT DOCUMENTS

| | | |
|---|---|---|
| JP | 2006-61831 | 3/2006 |
| JP | 3824838 | 9/2006 |
| JP | 2008-137847 | 6/2008 |
| JP | 2010-42381 | 2/2010 |
| JP | 5392745 | 1/2014 |
| JP | 5449289 | 3/2014 |
| JP | 2017-523031 | 8/2017 |
| WO | 03/045536 | 6/2003 |
| WO | 2010/021127 | 2/2010 |
| WO | 2016/005227 | 1/2016 |

OTHER PUBLICATIONS

Saxton et al., "Xenon adsorption in synthetic chabazite zeolites", Microporous and Mesoporous Materials, 129, 2010, pp. 68-73.*
Intrenational Search Report issued in International Application No. PCT/JP2017/046790, dated Mar. 6, 2018.
IPRP issued in International Application No. PCT/JP2017/046790, dated Mar. 6, 2018.

* cited by examiner

[FIG.1]
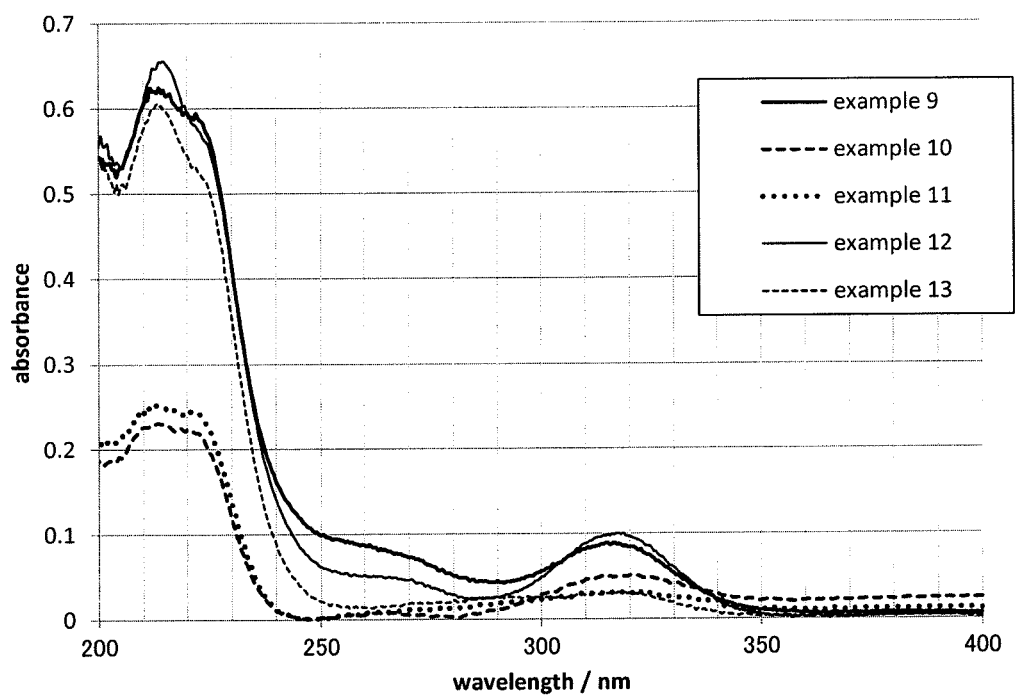

[FIG.2]
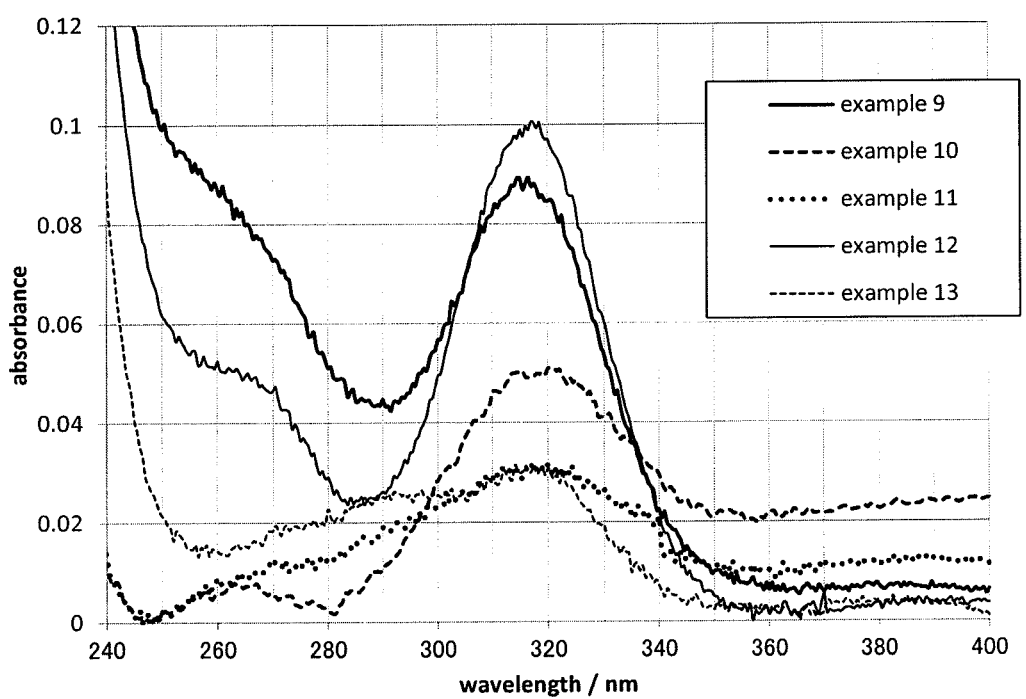

XENON ADSORBENT

TECHNICAL FIELD

The present invention relates to xenon adsorbents. A xenon adsorbent of the present invention is useful for applications of selective adsorption and recovery of xenon from a gas mixture, for example.

BACKGROUND ART

Applications of Xenon are, for example, anesthetic gases in the medical industry, medical images, ion propulsion engines (aerospace), flat panel displays (plasma), and high intensity discharge (HID) lights, as described in Patent Literature 1.

Xenon is used also in producing processes of semiconductor products such as semiconductor integrated circuits, liquid crystal panels, solar cell panels, and magnetic disks, as described in Patent Literature 2. In recent years, the consumption of xenon has increased for performing more advanced processing.

Xenon, however, is a trace component (87 ppb) in atmosphere, and obtaining 1 L of xenon by separation from air requires 11,000,000 L of air. Thus, xenon is an extremely expensive gas.

Accordingly, it is required to adsorb and recover xenon from a mixture gas containing xenon.

Patent Literature 1 discloses alumina, zeolite, silica gel, and activated carbon as adsorbents having a $Xe/N_2$ selectivity ratio of less than 65. However, Patent Literature 1 illustrates no specific adsorbent.

Patent Literature 2 discloses activated carbon, a Na—X-type zeolite, a Ca—X-type zeolite, a Ca-A-type zeolite, and a Li—X-type zeolite as adsorbents to adsorb xenon as a readily adsorbable component. However, it was difficult to say that those adsorbents have a sufficient performance to adsorb xenon at a low concentration.

As xenon adsorbents, Patent Literature 3 discloses silver ion-exchanged ZSM5 and Patent Literature 4 discloses a Ca—X-type zeolite or a Na—Y-type zeolite. However, it was difficult to say that those adsorbents have a sufficient performance to adsorb xenon at a low concentration.

Patent Literature 5 discloses, as xenon adsorbents, a synthetic zeolite having a pore size of 5 Å or more and a molecular sieving carbon having a pore size 5 Å or more. However, these Literatures illustrate no specific adsorbents.

It was difficult to say that any of the adsorbents has a sufficient performance to adsorb xenon especially at a low concentration.

CITATION LIST

Patent Literature

Patent Literature 1: Japanese Patent No. 5449289
Patent Literature 2: Japanese Patent Laid-Open No. 2006-61831
Patent Literature 3: Japanese Patent No. 5392745
Patent Literature 4: Japanese Patent No. 3824838
Patent Literature 5: Japanese Patent Laid-Open No. 2008-137847

SUMMARY OF INVENTION

Technical Problem

The present invention is intended to provide a xenon adsorbent that adsorbs a larger amount of xenon especially at a low concentration than conventional xenon adsorbents and further has a high selectivity to nitrogen, which is one of air components. The xenon adsorbent of the present invention is capable of efficiently adsorbing xenon from a mixture gas.

Solution to Problem

The present inventors have made extensive investigations to solve the aforementioned problems and it was found that zeolites having a pore size in the range of 3.5 to 5 Å and a silica alumina molar ratio in the range of 10 to 30 are excellent as xenon adsorbents, thereby having completed the present invention.

That is, the present invention consists in the following [1] to [6]:

[1] A xenon adsorbent comprising a zeolite having a pore size in the range of 3.5 to 5 Å and a silica alumina molar ratio in the range of 10 to 30.

[2] The xenon adsorbent according to [1], comprising at least one selected from the group consisting of lithium, sodium, potassium, magnesium, calcium, strontium, barium, iron, copper, and silver, as a metal component contained in the zeolite.

[3] The xenon adsorbent according to [1] or [2], wherein the stoichiometric ratio of the metal component relative to the aluminum in the zeolite is 0.1 to 1.0 equivalent amount (in a case where a valence of an ion of a metal is represented by n, the equivalent amount is a value obtained by multiplying a metal/Al molar ratio by the valence n of the metal).

[4] The xenon adsorbent according to any of [1] to [3], wherein the xenon adsorbent comprises silver, an ultraviolet-visible absorption spectrum of the silver measured after calcination of the xenon adsorbent at 500° C. in air has an absorbance peak in the range of 290 to 350 nm, and the absorbance peak has a maximum value in the range of 310 to 330 nm.

[5] The xenon adsorbent according to any of [1] to [4], wherein the zeolite comprises at least one structure selected from the group consisting of CHA-type, FER-type, HEU-type, and MWW-type structures.

[6] The xenon adsorbent according to any of [1] to [5], wherein the xenon adsorbent is a molded body.

Advantageous Effect of Invention

The xenon adsorbent of the present invention can efficiently adsorb xenon, even at a low concentration, from a mixture gas.

DESCRIPTION OF EMBODIMENT

Hereinafter, the present invention will be described.

The xenon adsorbent of the present invention contains a zeolite having a pore size in the range of 3.5 to 5 Å and a silica alumina molar ratio in the range of 10 to 30.

The pore size herein refers to the pore size described in zeolite structure data collection "Atlas of Zeolite Framework Types" published by International Zeolite Association in 2007 (Elsevier) (however, when the pores are ellipsoidal, the pore size refers to the minor axis, which geometrically restricts molecules to be adsorbed).

The reason why the zeolite having a pore size in the range of 3.5 to 5 Å has an excellent xenon adsorption performance is not clear, but that the pore size of the zeolite is close to the size of a xenon molecule, about 4 Å, may have an influence on the excellent xenon adsorption performance. Even zeolites having a pore size less than 4 Å can adsorb xenon because the pore size is changed by thermal vibration of the crystal framework. When the pore size is less than 3.5 Å, xenon is not adsorbed, and when the pore size is more than 5 Å, other components coexisting with xenon are predominantly adsorbed. The pore size is preferably in the range of 3.5 Å or more and less than 4.5 Å in order to facilitate adsorption of xenon.

The silica alumina molar ratio is a $SiO_2/Al_2O_3$ molar ratio. With the ratio is less than 10, metal components that form adsorption sites are abundant, the polarity becomes too strong, and other components coexisting with xenon are predominantly adsorbed. With the ratio more than 30, metal components that form adsorption sites are scarce, and a sufficient adsorption performance is not provided.

As a metal component to be contained in a zeolite for use in the xenon adsorbent of the present invention, at least one selected from the group consisting of lithium, sodium, potassium, magnesium, calcium, strontium, barium, iron, copper, and silver is preferably contained. Particularly, at least one selected from the group consisting of sodium and silver is preferably contained. Xenon is a monoatomic molecule and thus a molecule having no polarity, but externally applying an electric field to xenon induces the dipole. Then, xenon obtains a polarity to thereby be adsorbed to the zeolite. As metal components to induce the dipole, the metal component described above is excellent.

The stoichiometric ratio of the metal component described above relative to the aluminum in the zeolite is 0.1 to 1.0 equivalent amount (in case where a valence of an ion of a metal is represented by n, the equivalent amount is a value obtained by multiplying a metal/Al molar ratio by the valence n of the metal), more preferably 0.4 to 1.0 equivalent amount, particularly preferably 0.5 to 1.0 equivalent amount, in order to allow xenon to be adsorbed more effectively.

Additionally, silver contained in the xenon adsorbent of the present invention is characterized in that its ultraviolet-visible absorption spectrum measured after calcination at 500° C. in air has an absorbance peak in the range of 290 to 350 nm, and the absorbance peak has a maximum value in the range of 310 to 330 nm. In the case of calcination of the xenon adsorbent of which ultraviolet-visible absorption spectrum is measured, a muffle furnace in form of a common box was used, the temperature was raised over 1 hour and 40 minutes while dry air of a volume equivalent to the internal volume of the muffle furnace per 1.0 to 1.2 minutes was blown into the furnace, and calcination was performed at 500° C. for 3 hours. The ultraviolet-visible absorption spectrum was obtained by measuring a specimen, calcined at 500° C. as described above, with use of a diffuse reflection method at room temperature.

The silver content of the xenon adsorbent of the present invention is preferably 1 to 20% by weight, more preferably 3 to 18% by weight, particularly preferably 4 to 15% by weight, in order to obtain a higher amount of xenon adsorbed.

A method for modifying the zeolite with a metal component is not particularly limited, and an ion exchange method, an impregnation method, an evaporation to dryness method, and the like can be used. The ion exchange method is achieved by contacting zeolite with a solution containing targeted ions until the amount of ions in the zeolite reaches a desired concentration. Common ion exchange methods such as a batch method and a flow through method are applicable. Modification with a metal component may be applicable to xenon adsorbents either in the form of a powder or a molded body. On producing the xenon adsorbent in the form of a molded body, either of the following may be possible: a zeolite powder is modified with a metal and then formed into a molded body, or a zeolite power is formed into a molded body and then modified with a metal. Additionally, a xenon adsorbent containing silver is thermally treated (calcined) at a temperature in the range of 300° C. to 700° C., preferably 400° C. to 600° C. to thereby enable the adsorption performance of xenon to be improved. The calcination atmosphere may be any of inert atmospheres such as air and nitrogen.

The zeolite for use in the xenon adsorbent of the present invention preferably includes at least one structure selected from the group consisting of CHA-type, FER-type, HEU-type, and MWW-type. Among these, any one of the CHA-type, the-FER type, the HEU-type, and the MWW-type is preferable, and the FER-type is most preferable. FER-type zeolites have a pore size of about 4.2 Å, which is the closest to the xenon molecule size, and are presumed to have an excellent xenon adsorption performance. Examples of CHA-type zeolites include chabazite, and examples of FER-type zeolites include ferrierite. Examples of HEU-type zeolites include heulandite and clinoptilolite, and examples of MWW-type zeolites include MCM-22, ITQ-1, and SSZ-25.

The zeolites having a pore size in the range of 3.5 to 5 Å and a silica alumina molar ratio in the range of 10 to 30 for use in the xenon adsorbent of the present invention can be produced by crystallizing a mixture of a silica source, an alumina source, an alkali source, and, as required, a structure directing agent under hydrothermal conditions, wherein the zeolites are preferably the CHA-type, FER-type, HEU-type, or MWW-type zeolites.

As the silica source, colloidal silica, amorphous silica, sodium silicate, tetraethyl orthosilicate, aluminosilicate gel, and the like can be used.

As the alumina source, aluminum sulfate, sodium aluminate, aluminum hydroxide, aluminum chloride, aluminosilicate gel, metal aluminum, and the like can be used. The silica source and alumina source are preferably in a form that can sufficiently and uniformly mix with other raw materials.

As the alkali source, hydroxides of sodium, potassium, and ammonium, various salts such as halides, hydrosulfate, nitrates, and carbonates, and alkali components in aluminates, silicates, aluminosilicate gel, and the like can be used.

A structure directing agent can be used as required. As the structure directing agent, amines can be used, for example. As the amines, at least one selected from the group consisting of tetramethylammonium hydroxide, tetramethylammonium halides, tetraethylammonium hydroxide, tetraethylammonium halides, tetrapropylammonium hydroxide, tetrapropylammonium halides, N,N,N-trimethyladamantane ammonium hydroxide, N,N,N-trimethyladamantane ammonium halides, N,N,N-trimethyladamantane ammonium carbonate, N,N,N-trimethyladamantane ammonium methyl carbonate, and N,N,N-trimethyladamantane ammonium sulfate can be included for use, for example.

For crystallization of zeolite, an autoclave can be used, and the crystallization temperature can be 100° C. or more and 250° C. or less, preferably 110° C. or more and 200° C. or less, further preferably 120° C. or more and 190° C. or less. The crystallization period can be 12 hours or more and 96 hours or less, preferably 14 hours or more and 84 hours or less, further preferably 16 hours or more and 72 hours or less. Crystallization may be performed either by being left to stand or under stirring.

After the crystallization is completed, solid-liquid separation may be performed, and an excess alkali solution can be washed with pure water, warm water, or the like. After washing, drying can be performed. The drying temperature may be 80° C. or more and 200° C. or less. The structure directing agent, if contained, can be removed by pyrolysis after the drying.

The zeolite produced by the method described above may be used as it is as a xenon adsorbent. The zeolite can be also mixed with a binder to form a xenon adsorbent in the form of a molded body.

The xenon adsorbent of the present invention can be formed into a molded body. On separating a mixture gas, a molded body is easier to handle. The method for molding is not particularly limited. As the binder for use in molding, inorganic binders such as clay, alumina, and silica can be used. Additionally, on molding, an organic auxiliary agent such as cellulose or an inorganic auxiliary agent such as phosphates can be used as a molding auxiliary agent. The shape of the molded body can be spherical, cylindrical, trefoil-shaped, ellipsoidal, bale-shaped, and ring-shaped, for example. The size of the molded body as the diameter can be 0.5 to 3 mm. The molded body can be calcined at a temperature of about 400 to 650° C. in air or an inert gas such as nitrogen in order to sinter the binder.

BRIEF DESCRIPTION OF DRAWINGS

FIG. 1 is an ultraviolet-visible absorption spectrum of a xenon adsorbent containing silver.

FIG. 2 is an enlarged view of the absorbance peak near 320 nm of FIG. 1.

EXAMPLES

Hereinafter, the present invention will be described more specifically with reference to examples, but the present invention is not limited thereto.

<Measurement of Amount of Xenon Adsorbed and Amount of Nitrogen Adsorbed>

Amounts of adsorbed were measured by using a adsorption measurement apparatus of fixed displacement type (BELSORP 28SA: manufactured by MicrotracBEL Corp.). An adsorbent was pretreated at 350° C. under a vacuum of 0.01 Pa or less for 2 hours. Amounts of adsorbed were measured at a temperature of 25° C. The amount of xenon adsorbed was measured at a pressure of 1 kPa, and the amount of nitrogen adsorbed was measured at a pressure of 100 kPa.

<Xenon Selectivity>

The xenon selectivity was calculated by the expression (1).

Xenon selectivity=(amount of xenon adsorbed at 1 kPa/1 kPa)/(amount of nitrogen adsorbed at 100 kPa/100 kPa)　　(1)

<Measurement of Ultraviolet-Visible Absorption Spectrum>

An ultraviolet-visible absorption spectrum of a xenon adsorbent containing silver was measured by raising the temperature of a muffle furnace having an internal volume of 30 L over 1 hour and 40 minutes while dry air was blown thereto at a flow rate of 25 L/min, performing calcination at 500° C. for 3 hours to thereby obtain a sample, and measuring the sample by a diffuse reflection method with use of a UV-visible spectrophotometer (V-650: manufactured by JASCO Corporation) equipped with an integrating sphere unit at room temperature.

As for the measurement condition, the measurement was performed in a wavelength range of 200 to 400 nm for 2 minutes.

Example 1

7.5 g of a 25% N,N,N-trimethyladamantane ammonium hydroxide aqueous solution, 37.0 g of pure water, 1.0 g of a 48% sodium hydroxide aqueous solution, 1.4 g of a 48% potassium hydroxide aqueous solution, and 9.3 g of amorphous aluminosilicate gel were added and sufficiently mixed to obtain a raw material composition. The composition of the raw material composition, as a molar ratio in the case where $SiO_2$ was set to 1, was $Al_2O_3$: 0.072, N,N,N-trimethyladamantane ammonium hydroxide: 0.065, $Na_2O$: 0.044, $K_2O$: 0.044, and $H_2O$: 18.

This raw material composition was sealed in an 80 cc stainless autoclave and heated at 150° C. for 70 hours while rotated at 55 rpm. A product after heated was subjected to solid-liquid separation, and the solid phase obtained was washed with a sufficient amount of pure water and dried at 110° C. to thereby obtain a product. It was found that the product was a CHA-type zeolite single phase by X-ray powder diffraction and fluorescent X-ray analysis. The dried powder of the CHA-type zeolite obtained was calcined under air flowing at 600° C. for 2 hours (pore size of the CHA-type zeolite: 3.8 Å). The CHA-type zeolite had a $SiO_2/Al_2O_3$ molar ratio of 13, a Na/Al ratio of 0.2, and a K/Al ratio of 0.4 (amount of metal (Na+K) relative to aluminum: 0.6 equivalent amount).

This CHA-type zeolite (xenon adsorbent) had an amount of xenon adsorbed at 25° C. and 1 kPa of 0.14 mol/kg and an amount of nitrogen adsorbed at 25° C. and 100 kPa of 0.47 mol/kg. The xenon selectivity was 29.8.

Example 2

825 g of pure water, 4.9 g of a 48% sodium hydroxide aqueous solution, 13.5 g of a 48% potassium hydroxide aqueous solution, and 557 g of amorphous aluminosilicate gel were added and sufficiently mixed to obtain a raw material composition. The composition of the raw material composition, as a molar ratio in the case where $SiO_2$ was set to 1, was $Al_2O_3$: 0.051, $Na_2O$: 0.071, $K_2O$: 0.019, and $H_2O$: 21.

This raw material composition was sealed in a 2000 cc stainless autoclave and heated at 180° C. for 72 hours under stirring. A product after heated was subjected to solid-liquid separation, and the solid phase obtained was washed with a sufficient amount of pure water and dried at 110° C. to thereby obtain a product. It was found that the product was a FER-type zeolite (pore size: 4.2 Å) single phase by X-ray powder diffraction and fluorescent X-ray analysis. The FER-type zeolite had a $SiO_2/Al_2O_3$ molar ratio of 18, a Na/Al ratio of 0.3, and a K/Al ratio of 0.7 (amount of metal (Na+K) relative to aluminum: 1.0 equivalent amount).

To the 100 parts by weight of the FER-type zeolite obtained, 20 parts by weight of attapulgite clay (MIN-U-GEL MB: manufactured by Active Minerals International LLC.), 3 parts by weight of carboxymethyl cellulose, 1 part by weight of RHEODOL (TWL-120: manufactured by Kao Corporation), and 110 parts by weight of pure water were added and kneaded by a Mix Muller. The kneaded product was extruded and molded into a cylinder having a diameter of 1.5 mmφ. The molded product was dried at 110° C. and then calcined at 650° C. for 3 hours in air to obtain a xenon adsorbent (molded body).

The xenon adsorbent obtained had an amount of xenon adsorbed at 25° C. and 1 kPa of 0.34 mol/kg and an amount of nitrogen adsorbed at 25° C. and 100 kPa of 0.60 mol/kg. The xenon selectivity was 56.7.

Example 3

The CHA-type zeolite after calcination obtained in Example 1 (pore size: 3.8 Å) was ion-exchanged with a sodium nitrate solution. The sodium-exchanged CHA-type zeolite obtained had a $SiO_2/Al_2O_3$ molar ratio of 13 and a Na/Al ratio of 0.8 (amount of metal (Na) relative to aluminum: 0.8 equivalent amount) and contained no K. The Na/Al ratio was 0.2 and the K/Al ratio was 0.4 before the ion exchange.

This sodium-exchanged CHA-type zeolite (xenon adsorbent) had an amount of xenon adsorbed at 25° C. and 1 kPa of 0.17 mol/kg and an amount of nitrogen adsorbed at 25° C. and 100 kPa of 0.64 mol/kg. The xenon selectivity was 26.6.

Examples 4 to 7

The FER-type zeolite after crystallization obtained in Example 2 (pore size: 4.2 Å, powder before molded, Example 6) was ion-exchanged with a sodium nitrate solution (Examples 4 and 5) or potassium nitrate (Example 7) to prepare four FER-type zeolites each having different Na and K contents ($SiO_2/Al_2O_3$ molar ratio: 18). The amount of xenon adsorbed at 25° C. and 1 kPa, amount of nitrogen adsorbed at 25° C. and 100 kPa, and xenon selectivity of each sample are shown in Table 1.

TABLE 1

| | Composition | | Equivalent amount relative to metal Al | Adsorption performance | | |
|---|---|---|---|---|---|---|
| | Na/Al | K/Al | | Amount of Xe adsorbed | Amount of $N_2$ adsorbed | Xe selectivity |
| Example 4 | 1.0 | 0.0 | 1.0 | 0.57 | 0.94 | 60.6 |
| Example 5 | 0.7 | 0.3 | 1.0 | 0.52 | 0.86 | 60.5 |
| Example 6 | 0.3 | 0.7 | 1.0 | 0.42 | 0.74 | 56.8 |
| Example 7 | 0.0 | 1.0 | 1.0 | 0.28 | 0.65 | 43.1 |

As shown in Table 1, with a larger amount of sodium exchange, the amount of xenon adsorbed was larger and the xenon selectivity was more excellent.

Example 8

1.07 g of a sodium aluminate aqueous solution (manufactured by Asada Chemical INDUSTRY Co., Ltd., $Al_2O_3$ 19.3%, $Na_2O$ 19.6%), 0.39 g of a 48% sodium hydroxide aqueous solution, and 51.6 g of pure water were sufficiently mixed. To this solution, 2.27 g of hexamethyleneimine and 4.40 g of amorphous silica (Nipsil-VN3: manufactured by TOSOH SILICA CORPORATION, $SiO_2$ 90.2%, $Al_2O_3$ 0.38%, $Na_2O$ 0.25%) were added, and the mixture was further mixed sufficiently to obtain a raw material composition. The composition of the raw material composition, as a molar ratio in the case where $SiO_2$ was set to 1, was $Al_2O_3$: 0.033, hexamethyleneimine: 0.35, $Na_2O$: 0.09, and $H_2O$: 45.

This raw material composition was sealed in an 80 cc stainless autoclave and heated at 150° C. for 7 days while rotated at 55 rpm. A product after heated was subjected to solid-liquid separation, and the solid phase obtained was washed with a sufficient amount of pure water, dried at 110° C., and further, calcined under air flowing at 600° C. for 2 hours. It was found that the product was an MWW-type zeolite (pore size: 4.0 Å) by X-ray powder diffraction. Additionally, it was found that the MWW-type zeolite had a $SiO_2/Al_2O_3$ molar ratio of 20 by fluorescent X-ray analysis.

The MWW-type zeolite calcined product obtained was ion-exchanged with a sodium nitrate solution. The sodium-exchanged MWW-type zeolite obtained had a $SiO_2/Al_2O_3$ molar ratio of 20 and a Na/Al ratio of 0.6 (amount of metal (Na) relative to aluminum: 0.6 equivalent amount).

This sodium-exchanged MWW-type zeolite (xenon adsorbent) had an amount of xenon adsorbed at 25° C. and 1 kPa of 0.17 mol/kg and an amount of nitrogen adsorbed at 25° C. and 100 kPa of 0.47 mol/kg. The xenon selectivity was 36.2.

Example 9

The CHA-type zeolite after calcination obtained in Example 1 (pore size: 3.8 Å) was ion-exchanged with a silver nitrate solution. The silver-exchanged CHA-type zeolite obtained had a $SiO_2/Al_2O_3$ molar ratio of 13 and a Ag/Al ratio of 0.6 (amount of metal (Ag) relative to aluminum: 0.6 equivalent amount), and contained no Na and K. The ultraviolet-visible absorption spectrum of this silver-exchanged CHA-type zeolite is shown in FIGS. 1 and 2. As seen from the figures, the zeolite had an absorbance peak having a peak top in the range of 310 to 330 nm.

This silver-exchanged CHA-type zeolite (xenon adsorbent) had an amount of xenon adsorbed at 25° C. and 1 kPa of 0.88 mol/kg and an amount of nitrogen adsorbed at 25° C. and 100 kPa of 0.65 mol/kg. The xenon selectivity was 135.

Example 10

The FER-type zeolite after crystallization obtained in Example 2 (pore size: 4.2 Å, powder before molded) was ion-exchanged with a silver nitrate solution. The silver-exchanged FER-type zeolite obtained had a $SiO_2/Al_2O_3$ molar ratio of 18 and a Ag/Al ratio of 0.5 (amount of metal (Ag) relative to aluminum: 0.5 equivalent amount), and contained no Na and K. The ultraviolet-visible absorption spectrum of this silver-exchanged FER-type zeolite is shown in FIGS. 1 and 2. As seen from the figures, the zeolite had an absorbance peak having a peak top in the range of 310 to 330 nm.

This silver-exchanged FER-type zeolite (xenon adsorbent) had an amount of xenon adsorbed at 25° C. and 1 kPa of 0.79 mol/kg and an amount of nitrogen adsorbed at 25° C. and 100 kPa of 0.63 mol/kg. The xenon selectivity was 125.

This silver-exchanged FER-type zeolite was calcined in a dry air atmosphere at 400, 500, and 600° C. for 3 hours (temperature raising rate: 5° C./min in any of the cases). The amount of xenon adsorbed at 25° C. and 1 kPa, amount of nitrogen adsorbed at 25° C. and 100 kPa, and xenon selectivity of each calcined silver-exchanged zeolite are shown in Table 2.

TABLE 2

| | Calcination temperature | Adsorption performance | | |
|---|---|---|---|---|
| | | Amount of Xe adsorbed | Amount of $N_2$ adsorbed | Xe selectivity |
| Silver-exchanged FER of Example 10 | Example 10 | 0.79 | 0.63 | 125 |
| | 400° C. | 0.91 | 0.73 | 125 |
| | 500° C. | 0.92 | 0.74 | 124 |
| | 600° C. | 0.89 | 0.73 | 122 |
| Silver-exchanged FER of Example 11 | Example 11 | 0.98 | 0.74 | 132 |
| | 500° C. | 1.13 | 0.91 | 124 |
| Silver-exchanged CHA of Example 13 | Example 13 | 0.79 | 0.59 | 134 |
| | 400° C. | 0.80 | 0.63 | 127 |
| | 500° C. | 0.85 | 0.66 | 129 |

As shown in Table 2, calcination in the range of 400° C. to 600° C. led to an increase in the amount of xenon adsorbed of the silver-exchanged zeolite.

Example 11

The silver-exchanged FER-type zeolite obtained in Example 10 was ion-exchanged again with a silver nitrate solution. The silver-exchanged FER-type zeolite obtained had a $SiO_2/Al_2O_3$ molar ratio of 18 and a Ag/Al ratio of 0.8 (amount of metal (Ag) relative to aluminum: 0.8 equivalent amount), and contained no Na and K. The ultraviolet-visible absorption spectrum of this silver-exchanged FER-type zeolite is shown in FIGS. 1 and 2. As seen from the figures, the zeolite had an absorbance peak having a peak top in the range of 310 to 330 nm.

This silver-exchanged FER-type zeolite (xenon adsorbent) had an amount of xenon adsorbed at 25° C. and 1 kPa of 0.98 mol/kg and an amount of nitrogen adsorbed at 25° C. and 100 kPa of 0.74 mol/kg. The xenon selectivity was 132.

This silver-exchanged FER-type zeolite was calcined in a dry air atmosphere at 500° C. for 3 hours (temperature raising rate: 5° C./min in any of the cases). The amount of xenon adsorbed at 25° C. and 1 kPa, amount of nitrogen adsorbed at 25° C. and 100 kPa, and xenon selectivity of each calcined silver-exchanged zeolite are shown in Table 2.

As shown in Table 2, calcination at 500° C. led to an increase in the amount of xenon adsorbed of the silver-exchanged zeolite.

Example 12

The MWW-type zeolite obtained in Example 8 (pore size: 4.0 Å) was ion-exchanged with a silver nitrate solution. The silver-exchanged MWW-type zeolite obtained had a $SiO_2/Al_2O_3$ molar ratio of 20 and a Ag/Al ratio of 0.5 (amount of metal (Ag) relative to aluminum: 0.5 equivalent amount), and contained no Na. The ultraviolet-visible absorption spectrum of this silver-exchanged MWW-type zeolite is shown in FIGS. 1 and 2. As seen from the figures, the zeolite had an absorbance peak having a peak top in the range of 310 to 330 nm.

This silver-exchanged MWW-type zeolite (xenon adsorbent) had an amount of xenon adsorbed at 25° C. and 1 kPa of 0.49 mol/kg and an amount of nitrogen adsorbed at 25° C. and 100 kPa of 0.38 mol/kg. The xenon selectivity was 129.

Example 13

The CHA-type zeolite after calcination obtained in Example 1 (pore size: 3.8 Å) was ion-exchanged with a silver nitrate solution. The silver-exchanged CHA-type zeolite obtained had a $SiO_2/Al_2O_3$ molar ratio of 13 and a Ag/Al ratio of 0.5 (amount of metal (Ag) relative to aluminum: 0.5 equivalent amount), and contained no Na and K. The ultraviolet-visible absorption spectrum of this silver-exchanged CHA-type zeolite is shown in FIGS. 1 and 2. As seen from the figures, the zeolite had an absorbance peak having a peak top in the range of 310 to 330 nm.

This silver-exchanged CHA-type zeolite (xenon adsorbent) had an amount of xenon adsorbed at 25° C. and 1 kPa of 0.79 mol/kg and an amount of nitrogen adsorbed at 25° C. and 100 kPa of 0.59 mol/kg. The xenon selectivity was 134.

This silver-exchanged CHA-type zeolite was calcined in a dry air atmosphere at 400 and 500° C. for 3 hours (temperature raising rate: 5° C./min in any of the cases). The amount of xenon adsorbed at 25° C. and 1 kPa, amount of nitrogen adsorbed at 25° C. and 100 kPa, and xenon selectivity of each calcined silver-exchanged zeolite are shown in Table 2.

As shown in Table 2, calcination in the range of 400° C. to 500° C. led to an increase in the amount of xenon adsorbed of the silver-exchanged zeolite.

Example 14

The FER-type zeolite after crystallization obtained in Example 2 (pore size: 4.2 Å, powder before molded) was ion-exchanged with an ammonium chloride solution and then ion-exchanged with a calcium nitrate solution. The calcium-exchanged FER-type zeolite obtained had a $SiO_2/Al_2O_3$ molar ratio of 18 and a Ca/Al ratio of 0.45 (amount of metal (Ca) relative to aluminum: 0.90 equivalent amount), and contained no Na and K.

This calcium-exchanged FER-type zeolite (xenon adsorbent) had an amount of xenon adsorbed at 25° C. and 1 kPa of 0.55 mol/kg and an amount of nitrogen adsorbed at 25° C. and 100 kPa of 0.70 mol/kg. The xenon selectivity was 78.6.

Example 15

The FER-type zeolite after crystallization obtained in Example 2 (pore size: 4.2 Å, powder before molded) was ion-exchanged with an ammonium chloride solution and then ion-exchanged with a magnesium nitrate solution. The magnesium-exchanged FER-type zeolite obtained had a $SiO_2/Al_2O_3$ molar ratio of 18 and a Mg/Al ratio of 0.45 (amount of metal (Mg) relative to aluminum: 0.90 equivalent amount), and contained no Na and K.

This magnesium-exchanged FER-type zeolite (xenon adsorbent) had an amount of xenon adsorbed at 25° C. and 1 kPa of 0.36 mol/kg and an amount of nitrogen adsorbed at 25° C. and 100 kPa of 0.50 mol/kg. The xenon selectivity was 72.0.

Example 16

The FER-type zeolite after crystallization obtained in Example 2 (pore size: 4.2 Å, powder before molded) was ion-exchanged with an ammonium chloride solution and then ion-exchanged by a lithium chloride solution. The lithium-exchanged FER-type zeolite obtained had a $SiO_2/Al_2O_3$ molar ratio of 18 and a Li/Al ratio of 1.0 (amount of metal (Li) to relative to aluminum: 1.0 equivalent amount), and contained no Na and K.

This lithium-exchanged FER-type zeolite (xenon adsorbent) had an amount of xenon adsorbed at 25° C. and 1 kPa of 0.63 mol/kg and an amount of nitrogen adsorbed at 25° C. and 100 kPa of 1.08 mol/kg. The xenon selectivity was 58.3.

Comparative Example 1

The amount of xenon adsorbed and amount of nitrogen adsorbed of a NaX-type zeolite molded body (ZEOLUM® F-9HA: manufactured by TOSOH CORPORATION, pore size of zeolite: 7.4 Å, silica alumina molar ratio: 2.5) were measured. The amount of xenon adsorbed at 25° C. and 1 kPa was 0.03 mol/kg and the amount of nitrogen adsorbed at 25° C. and 100 kPa was 0.43 mol/kg. The xenon selectivity was 7.0.

Comparative Example 2

The amount of xenon adsorbed and amount of nitrogen adsorbed of a LiLSX-type zeolite molded body (ZEOLUM® NSA-700: manufactured by TOSOH CORPORATION, pore size of zeolite: 7.4 Å, silica alumina molar ratio: 2.0) were measured. The amount of xenon adsorbed at 25° C. and 1 kPa was 0.03 mol/kg and the amount of nitrogen adsorbed at 25° C. and 100 kPa was 1.13 mol/kg. The xenon selectivity was 2.7.

Comparative Example 3

The amount of xenon adsorbed and amount of nitrogen adsorbed of a CaX-type zeolite molded body (ZEOLUM® SA-600A: manufactured by TOSOH CORPORATION, pore size of zeolite: 7.4 Å, silica alumina molar ratio: 2.5) were measured. The amount of xenon adsorbed at 25° C. and 1 kPa was 0.11 mol/kg and the amount of nitrogen adsorbed at 25° C. and 100 kPa was 1.14 mol/kg. The xenon selectivity was 9.6.

Comparative Example 4

The amount of xenon adsorbed and amount of nitrogen adsorbed of a CaA-type zeolite molded body (ZEOLUM® SA-500A: manufactured by TOSOH CORPORATION, pore size of zeolite: 4.1 Å, silica alumina molar ratio: 2.0) were measured. The amount of xenon adsorbed at 25° C. and 1 kPa was 0.05 mol/kg and the amount of nitrogen adsorbed at 25° C. and 100 kPa was 0.57 mol/kg. The xenon selectivity was 8.8.

Comparative Example 5

A NaY-type zeolite (HSZ-320NAA: manufactured by TOSOH CORPORATION, pore size of zeolite: 7.4 Å, silica alumina molar ratio: 5.7) was ion-exchanged with an ammonium chloride solution and then ion-exchanged with a silver nitrate solution. The silver-exchanged FAU-type zeolite obtained had a $SiO_2/Al_2O_3$ molar ratio of a 5.7, a Ag/Al ratio of 0.2, and a Na/Al ratio of 0.2.

This silver-exchanged FAU-type zeolite (xenon adsorbent) had an amount of xenon adsorbed at 25° C. and 1 kPa of 0.02 mol/kg.

This silver-exchanged FAU-type zeolite was calcined in a dry air atmosphere at 500° C. for 3 hours (temperature raising rate: 5° C./min in any of the cases). The silver-exchanged zeolite after calcination had an amount of xenon adsorbed at 25° C. and 1 kPa of 0.02 mol/kg. Calcination at 500° C. led to no increase in the amount of xenon adsorbed of the silver-exchanged zeolite.

The entire contents of the specification, claims, drawings, and abstract of Japanese Patent Application No. 2017-1299, filed on Jan. 6, 2017, Japanese Patent Application No. 2017-125856, filed on Jun. 28, 2017, and Japanese Patent Application No. 2017-218780, filed on Nov. 14, 2017 are incorporated by reference herein as a disclosure of the specification of the present invention.

INDUSTRIAL APPLICABILITY

The xenon adsorbent of the present invention, which adsorbs a large amount of xenon at a low concentration, can efficiently adsorb xenon from a mixture gas.

The invention claimed is:
1. A xenon adsorbent comprising:
   a zeolite having a pore size in the range of 3.5 to 5 Å; and a silica alumina molar ratio in the range of 10 to 30, wherein the xenon adsorbent comprises silver,
   an ultraviolet-visible absorption spectrum of the silver measured after calcination of the xenon adsorbent at 500° C. in air has an absorbance peak in the range of 290 to 350 nm, and
   the absorbance peak has a maximum value in the range of 310 to 330 nm.
2. The xenon adsorbent according to claim 1, further comprising at least one selected from the group consisting of lithium, sodium, potassium, magnesium, calcium, strontium, barium, iron, and copper, as a metal component contained in the zeolite.
3. The xenon adsorbent according to according to claim 1, wherein
   the stoichiometric ratio of the metal component relative to the aluminum in the zeolite is 0.1 to 1.0 equivalent amount (in a case where a valence of an ion of a metal is represented by n, the equivalent amount is a value obtained by multiplying a metal/Al molar ratio by the valence n of the metal).
4. The xenon adsorbent according to claim 1, wherein
   the zeolite comprises at least one structure selected from the group consisting of CHA-type, FER-type, HEU-type, and MW-type.
5. The xenon adsorbent according to claim 1, wherein the xenon adsorbent is a molded body.
6. The xenon adsorbent according to claim 1, wherein
   the xenon adsorbent further comprises at least one selected from the group consisting of lithium, sodium, potassium, magnesium, calcium, strontium, barium, iron, and copper, as a metal component contained in the zeolite, and
   the zeolite comprises at least one structure selected from the group consisting of CHA-type, FER-type, HEU-type, and MWW-type.

* * * * *

UNITED STATES PATENT AND TRADEMARK OFFICE
CERTIFICATE OF CORRECTION

Page 1 of 1

PATENT NO. : 11,065,597 B2
APPLICATION NO. : 16/475226
DATED : July 20, 2021
INVENTOR(S) : S. Hirano et al.

It is certified that error appears in the above-identified patent and that said Letters Patent is hereby corrected as shown below:

On the Title Page

Item (57)/abstract (Line 2), please change "Provided" to -- provided --.
Page 2 Item (56)/other publications (Line 3), please change "Intrenational" to -- International --.

In the Claims

At Column 12, Line 49 (Claim 4), please change "MW" to -- MWW --.

Signed and Sealed this
Eighteenth Day of January, 2022

Drew Hirshfeld
*Performing the Functions and Duties of the
Under Secretary of Commerce for Intellectual Property and
Director of the United States Patent and Trademark Office*